March 22, 1966  J. G. W. LEE  3,242,339
SYSTEM FOR OBTAINING AN INDICATION OF A TIME PARAMETER
DEFINING THE RELATIVE MOTION OF A MOVING OBJECT AND
A MOVING TARGET
Filed Dec. 27, 1962  3 Sheets-Sheet 2

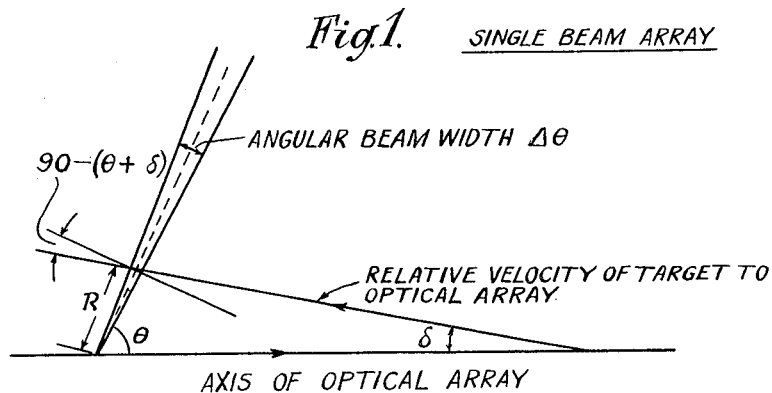
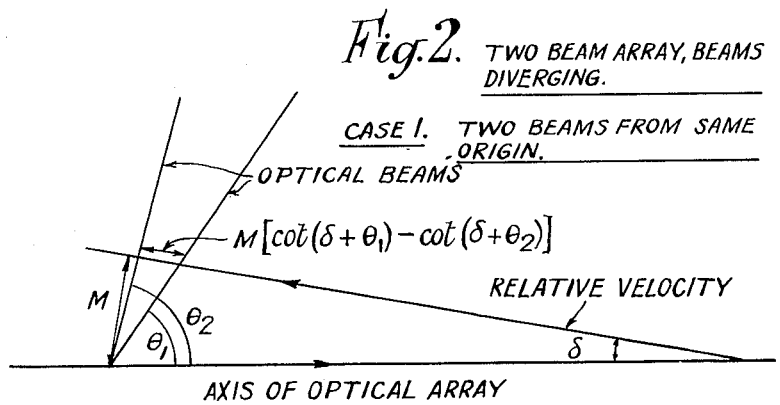
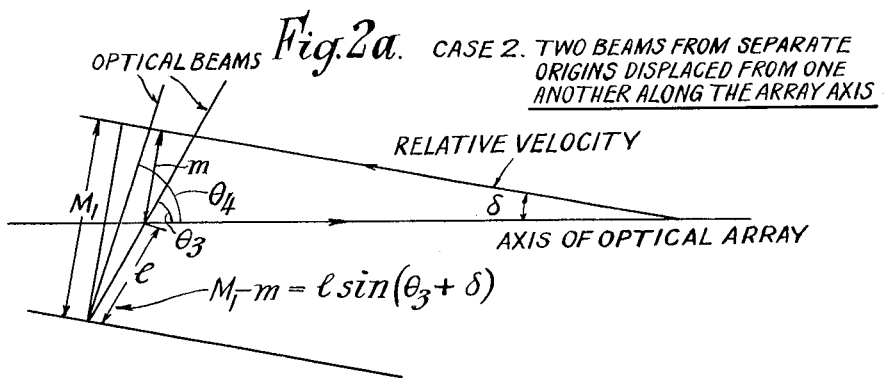

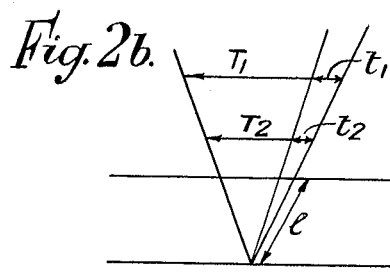

Fig. 2b.

IN ALL CASES $T_n = Kt_n$
WHERE $K$ IS A CHOSEN CONSTANT.

AXIS OF OPTICAL ARRAY

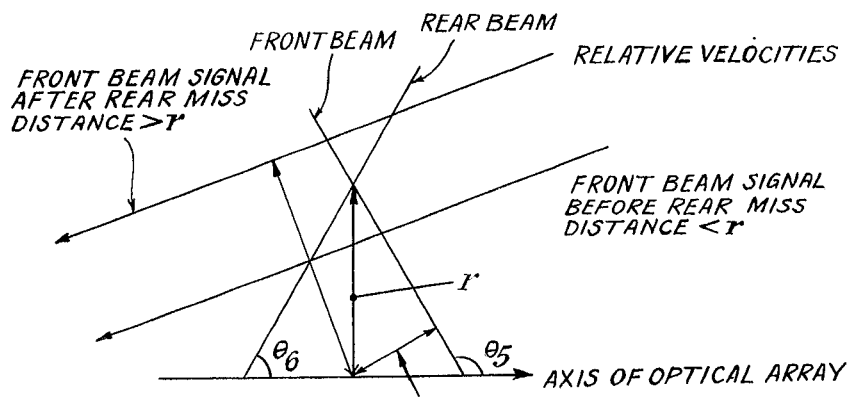

Fig. 3. TWO BEAM SYSTEM, BEAMS CONVERGING.

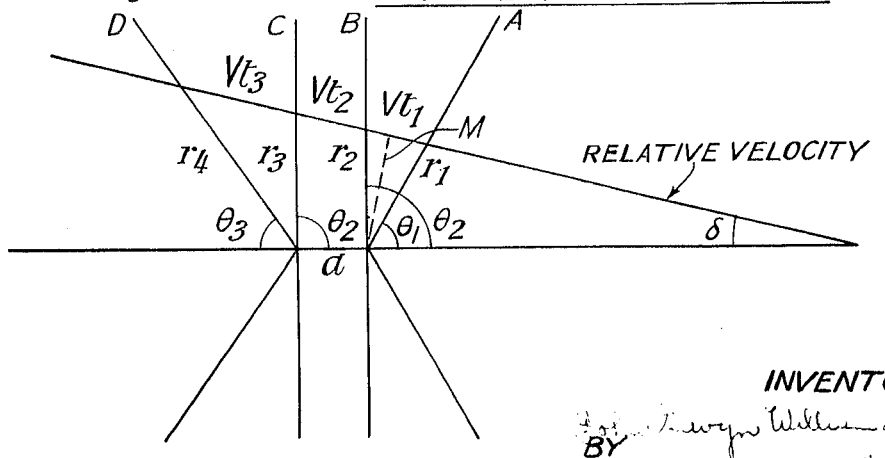

Fig. 4. FOUR FIELDS OF VIEW SYSTEM.
TWO FIELDS OF VIEW PARALLEL,
TWO DIVERGENT

INVENTOR
Llewyn William Lee
BY
Stevens, Davis, Miller & Mosher
ATTORNEYS

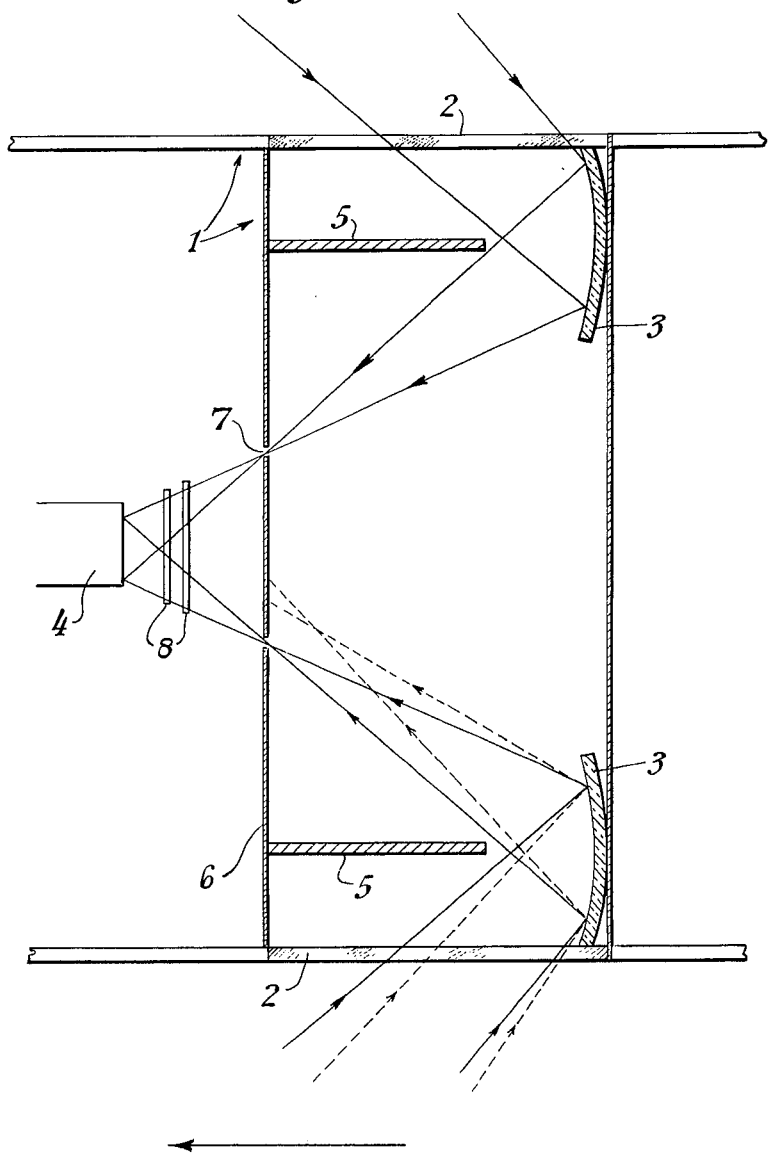

United States Patent Office 3,242,339
Patented Mar. 22, 1966

3,242,339
SYSTEM FOR OBTAINING AN INDICATION OF A TIME PARAMETER DEFINING THE RELATIVE MOTION OF A MOVING OBJECT AND A MOVING TARGET
John Gwyn William Lee, Welwyn, England, assignor to The De Havilland Aircraft Company Limited, Hatfield, England
Filed Dec. 27, 1962, Ser. No. 247,762
Claims priority, application Great Britain, Dec. 1, 1958, 38,749/58
2 Claims. (Cl. 250—203)

This is a continuation-in-part application of United States patent application Serial No. 856,612, filed December 1, 1959, by John G. W. Lee, now abandoned.

This invention relates to the detection of passing targets and objects and is concerned with a system producing an indication of their passing conditions by optical means. By the system, there is obtained an indication of a time parameter defining the relative motion of a moving object and a moving target. The system has particular application in guided missiles as a means of obtaining an indication of the miss distance and velocity vector of the target with respect to the missile and hence to predict the optimum time at which to detonate the warhead. The system however could be used in any application where it is required to determine all or some of the parameters defining the relative motion of a moving object. The system requires the use of an array of optical detectors, the type of detector depending on the nature of the object whose motion is to be determined and the nature of the detector array depending on the accuracy and quantity of information required.

It is proposed in the ensuing description to refer to the object, the passing conditions of which it is desired to determine, as the target object.

Target objects may be classified in two forms:
(1) Those whose temperature is such that they emit detectable quantities of visible and/or infrared radiation.
(2) Those whose temperature is such that they are not emitters by definition (1) but which obscure detectable quantities of radiation from the background in which they exist or whose environment is such that they reflect or scatter detectable quantities of background ultra violet, visible or infra red radiation.

With detectors which comprise optical systems focussing incident radiation on to a photo sensitive device, the passage through their field of view of targets type (1) or (2) above can be determined by observing the change in incident radiant energy. (In most guided missile applications, targets possess hot areas of metal or gas and can be classified as emitters in (1) above.)

Targets in category (2) which may arise in unsuitable environments for detection of reflected or obscured radiation in missile and particularly in non-missile applications can be provided with a suitable environment by an appropriate illumination of the detector field.

The system in accordance with the present invention makes use of one or more suitably spaced detectors each including a photosensitive element having a field of view of small and accurately defined angular beam width.

The photosensitive element in each detector and the optical components are chosen to give maximum sensitivity in the waveband most suited for detection of the particular type of target object. The optical design of the detector unit is determined by its application.

In most missile applications and applications where motion in any direction with respect to a datum axis must be determined, a detector with a field of view corresponding to a surface of revolution about this axis (all round field of view) will be required. In those applications where a target may only pass within a restricted transverse angle the transverse field of view of the detector may be similarly restricted. In those applications requiring all round field of view the system most suited is that giving a transverse field of view lying on the surface of a cone (of semi-angle up to 90°) the axis of which is coincident with or parallel to the datum axis. Such a transverse field of view may be produced by a single detector or an array of detector units, so arranged that their individual fields of view combine to give total field of view lying on the conical surface. In any plane through the axis of the conical surface the field of view is of small and accurately defined angular beam width.

Reference will now be made to FIGURE 5 accompanying this specification, this being a fragmentary section on the longitudinal axis of a guided missile having an all round field of view in a lateral and forward direction of small but accurately defined angular beam width. Such a detector unit or assembly as is about to be described is preferably situated at some suitable point throughout the length of the missile and if desired there may be two or more of such assemblies arranged in tandem in which case they may each have the same or a different angle of acceptance.

In FIGURE 5 the casing of a guided missile is indicated by reference numeral 1, the casing being provided with a series of transparent windows 2, equally spaced around the casing's periphery.

An annular parabolic reflector 3 is mounted within the casing in such a position that rays entering the windows will be reflected by the mirror into a centrally positioned photo-sensitive cell 4. It is desired that the missile shall have a transverse field of view restricted between two defining surfaces, which in the construction shown are in slightly different forwardly inclined directions, and with this object in view screens 5 and 6 are provided within the casing which define the edges of the area through which radiations are receivable by the photo-sensitive cell and accurately determine the angularity of the defining surfaces of the field of view in relation to the longitudinal axis of the missile.

This accurate determination of the defining surfaces restricts the width of the field of view at a particular distance from the optical axis, sets the angle and is obtained by an annular slot 7 in the screen 6 as will be evident from the lower part of the figure where the accepted radiations are shown in full lines and rejected radiations are shown by dotted lines.

Screen 5 may be of annular form, this screen serving to protect the photosensitive cell 4 from direct radiations which might otherwise pass through the windows directly to the cell.

Filters 8 may be provided through which the accepted radiations must pass on their way to the photosensitive cell.

Targets as hereinbefore defined passing through the sensitive fields of view of the detector defined by window 2, mirrow 3, slot 7, and photosensitive cell 4 cause a change of incident energy falling onto the sensitive surface of the cell and a consequent change in output of the cell.

By combining detectors of the above type in a tandem or otherwise defined array with respect to the datum axis and by employing detectors with fields of view lying on cones of different or similar semi-angles it is possible to produce a system which in any plane containing the datum axis comprises a series of discrete diverging and/or converging and/or parallel acceptance fields of view which may intersect at the datum axis or at defined positions with respect to this. With such a system if a target object (as hereinbefore defined) moves so as to pass through all or some of these detector fields of view a change in electrical output from the sensitive cell in each detector assembly will be produced. The duration and amplitude of such changes, and the time intervals between them may be measured by a device suitable to the environment in which the detector system is operating, and initiated by the first occurring change in sensitive cell output. From the distribution in time of these changes in sensitive cell output, or pulses, and the geometry of the detector array, information relating to the parameters defining the relative motion of the target object may be determined.

The complexity of the detector array will define the amount of passing information available. In the first case it is proposed to refer to FIGURES 1 to 4 of the accompanying drawings, which illustrate diagrammatically alternative methods of carrying out the invention. The diagrams shown have been kept to coplanar cases, in which the relative velocity and axis of the detector lie in the same plane. The general principles illustrated may be applied to skew line passings where the skew angle is small, such often being the case in guided missile applications to which reference has hereinbefore been made.

Thus a single detector array shown in FIGURE 1 of single conical field of view restricted between two conical defining surfaces may provide accurate information on "instant at particular line of sight" with low grade information from the duration in time and amplitude of the pulse on rate of turn of sight line.

The sight line is the line joining the apparent centre of the optical array and the target object.

$\theta$ is the angle between the axis of optical array and the forward conical defining surface;

$\Delta\theta$ is the small angle between the defining surfaces, that is the angular width of the field of view;

$\delta$ is the angle between the axis of optical array and the direction of relative velocity of the target to the optical array;

V is the relative velocity;

T is the duration of the pulse from the detector of the optical unit and

R is the distance along the field of view from the axis of the optical array to the intersection of the field with the direction of relative movement.

The component of the relative velocity perpendicular to the optical beam is $V \sin (\theta+\delta)$.

Hence if the duration of the pulse from the detector of the optical unit is T, the rate of turn of sight line is equal to:

$$\frac{\Delta\theta}{T} = \frac{V \sin (\theta+\delta)}{R}$$

where V, R and $\delta$ are unknown, and $\theta$, $\Delta\theta$ and T determinable. Since it is known that radiation intensity is inversely related to the square of the distance from the source of radiation, low grade indication of R may be obtained from pulse height or amplitude if said pulse resulting from the change of incident radiation falling on the detector is measured or compared to a standard signal by appropriate circuitry.

A double detector array, FIGURE 2 (say two tandem divergent conical fields of view) will provide accurate information on "instant at particular line of sight" for two lines of sight and hence accurate information on rate of turn of sight line and low grade information from the duration in time and the amplitude of the pulse on miss distance, and relative velocity.

Further a relationship between V, T and $\delta$ can be obtained $$VT = M (\cot (\delta+\theta_1) - \cot (\delta+\theta_2))$$

where:

$\theta_1$ is the angle between the axis of optical array and the forward defining surface of one of the fields of view;

$\theta_2$ is the angle between the axis of optical array and the forward defining surface of the other field of view;

M is the distance along the perpendicular from the relative velocity vector to the intersection of the fields of view and the optical axis.

In the case of FIGURE 2a diagrammatically illustrating two beams from separate origins displaced from one another along the array axis, a relationship between V, m and $\delta$ is obtained $$Vt_3 = [m+l \sin (\theta_3+\delta)][\cot (\delta+\theta_3) - \cot (\delta+\theta_4)]$$

where:

$\theta_3$ is the angle between the aixs of optical array and the forward defining surface of one field of view;

$\theta_4$ is the angle between the axis of optical array and the forward defining surface of the other field of view;

$M_1$ is the distance along the perpendicular from the relative velocity vector to the intersections of the field of view;

$m$ is the distance from the apparent centre of optical array to the direction of relative velocity along the one field;

$l$ is the distance from the centre of optical array to the intersection of the fields of view; and $t_3$ is the time separation of pulses produced by intersection with $\theta_3$ and $\theta_4$ fields.

This system has special application in missiles as indicated in FIGURE 2b. Here the interval between the signals from the two fields multiplied by a constant gives the instant at which the target lies on a third line ("delay line") from the same focus.

Thus $t_1$ and $t_2$ are the time separations of pulses produced by intersection with $\theta_3$ and $\theta_4$ fields at two distances from the axis of optical array.

$T_1$ and $T_2$ are delay times after the second pulses and are the products of a chosen constant K and the two times $t_1$ and $t_2$.

By choice of suitable beam angles and value of $l$ and K this delay line can be arranged to pass through any required point in the missile and directed in any desired direction.

By adopting a convergent beam configuration, FIGURE 3, in the second case above, accurate miss distance boundaries can be defined by pulse sequence. This system provides definite bounds within or without which miss distance must lie, independent of all other parameters.

The angle $\theta_5$ between the axis of the optical array and the forward defining surface of the front field of view is greater than 90° and the angle $\theta_6$ between the axis of the optical array and the forward defining surface of the rear field of view is less than 90°. The distance from the axis to the intersection of the fields is $r$.

If the pulse due to passage through the defining surface of the front field of view precedes the pulse due to passage through the defining surface of the rear field of view, then miss distance is less than $r$. If to the contrary, then the miss distance is greater than $r$.

FIGURE 4 shows an arrangement of four detectors spaced at known intervals along the axis of the missile and having their fields of view A, B, C, D inclined at angles to the missile axis such that those of the extreme assemblies i.e., A and D diverge, and those of the inner assemblies i.e., B and C are maintained parallel to each other, A, B, C and D being the fields of view generated by the detectors.

Reference to FIGURE 4 shows that:

$$\frac{a}{Vt_2} = \frac{r_1 \cos \theta_1}{Vt_1} = \frac{r_4 \cos \theta_3}{Vt_3}$$

where:

$a$ is the distance between parallel fileds of view B, C;

V is the relative velocity of the target with respect to the detector array $t_1$, $t_2$, $t_3$, are the time intervals of pulses between intersections with fields of view A, B and C and D respectively;

$r_1$ is the distance between the intersection of field of view A and the relative velocity vector, and the intersection of field of view A and the optical axis;

$r_4$ is the distance between the intersection of field of view D and the relative velocity vector and the intersection of field of view D and the optical axis;

$\theta_1$ is the angle between the optical axis and the sensitive field of view A and $\theta_3$ is the angle between the optical axis and the sensitive field of view D. From the above $$r_1 = \frac{t_1}{t_2} a \sec \theta_1$$

similarly $r_4 = \frac{t3}{t2} a \sec \theta_3$ further $\delta = \tan^{-1}\left[\dfrac{\dfrac{t3}{t2}\tan\theta_3 - \dfrac{t1}{t2}\tan\theta_1}{+\dfrac{t3}{t2}+\dfrac{t1}{t2}}\right]$ where:

$\delta$ is the angle between the relative velocity of the target and the axis of the detector array Thus V may be determined
since $$V = \frac{a}{t2} \sec \delta$$

also $r_2$ and $r_3$

Thus V, $\delta$, and M are completely determined.

Where:

M is the perpendicular distance from the relative velocity vector to the intersection of the 1st field of view A on the optical axis.

More complex arrays and variations of these arrays in terms of convergence and divergence of detector fields of view, and position of detectors with respect to datum axis enables the quantity of information and accuracy of said information to be increased.

In addition to the above a system employing a multiple array of detectors to give an "all round field of view" will provide information on the angular sector of pass.

I claim:

1. A system for obtaining an indication of a time parameter defining the relative motion of an object having an axis and moving in a first direction parallel to said axis and a target moving in a second relative direction comprising four detector units on said object sensitive to radiations to produce an electric signal upon a change in such radiations received by the unit, said detector units being spaced at known intervals along said axis of said object so that two units are outermost and two units are innermost and having their fields of view inclined at angles to said axis of said object such that those of the outermost units diverge and those of the innermost units are maintained parallel to each other, stop means mounted in said object for accurately defining the angular limits of the field of view within which such radiations are receivable by each detector unit and for determining for each unit two surfaces transverse to the first direction of movement of said object, each said detector unit adapted to produce an electric signal the amplitude of which is related to the rate of change of the intensity of radiation received by the unit.

2. The combination of a moving body and a target detection system for indicating the time parameter defining the relative distance and velocity of the body moving along a first axis and the target moving along a second axis, said body having an annular casing with a central longitudinal axis and having a series of windows spaced around said casing; said detection system comprising an annular member having at least a portion of its face in the form of a parabolic reflector mounted in said casing and being coaxial therewith, said reflector positioned with its outer periphery contiguous said windows and having its inner periphery spaced from said central axis such that rays entering the windows from predetermined outward fields of view are reflected by said reflector toward said central axis; a detector unit mounted in said casing on said central axis and being axially spaced from said reflector a distance so as to receive the reflected radiation; a first screen mounted through a cross section of said body at a position between said reflector and said detector unit and having an annular slot defined therein through which a portion of the reflected rays pass such that said slot and said reflector cooperate to define the predetermined fields of view substantially in the form of a solid of revolution; and a second annular screen member mounted coaxial within said casing and having walls concentric with and spaced from said windows, said walls being positioned to prevent direct radiation which passes through said windows from passing through said annular slot.

References Cited by the Examiner
UNITED STATES PATENTS

| | | | |
|---|---|---|---|
| 2,424,193 | 7/1947 | Rost et al. | |
| 2,653,309 | 9/1953 | Hausz | 250—220 X |
| 2,952,778 | 9/1960 | Henderson | 102—70.2 |
| 2,960,908 | 11/1960 | Willets et al. | 250—220 X |
| 3,034,436 | 5/1962 | Arthaber et al. | 102—70.2 |
| 3,036,219 | 5/1962 | Thompson | 250—220 |
| 3,061,727 | 10/1962 | Roth et al. | 250—83.3 |
| 3,120,360 | 2/1964 | Edwards | 250—83.3 |

RALPH G. NILSON, *Primary Examiner.*

MAYNARD R. WILBUR, CHESTER L. JUSTUS,
*Examiners.*

M. A. LEAVITT, *Assistant Examiner.*